United States Patent
Kim et al.

(10) Patent No.: US 10,506,432 B2
(45) Date of Patent: Dec. 10, 2019

(54) METHOD AND APPARATUS FOR AUTHENTICATING ACCESS AUTHORITY FOR SPECIFIC RESOURCE IN WIRELESS COMMUNICATION SYSTEM

(71) Applicant: LG ELECTRONICS INC., Seoul (KR)

(72) Inventors: Seongyun Kim, Anyang-si (KR); Seungkyu Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 43 days.

(21) Appl. No.: 15/481,577

(22) Filed: Apr. 7, 2017

(65) Prior Publication Data
US 2017/0215072 A1    Jul. 27, 2017

Related U.S. Application Data

(63) Continuation of application No. 14/377,997, filed as application No. PCT/KR2013/009742 on Oct. 30, 2013, now Pat. No. 9,654,971.
(Continued)

(51) Int. Cl.
*H04M 1/66* (2006.01)
*H04W 12/06* (2009.01)
(Continued)

(52) U.S. Cl.
CPC ............ *H04W 12/06* (2013.01); *H04L 63/101* (2013.01); *H04W 4/08* (2013.01); *H04W 4/70* (2018.02); *H04W 12/08* (2013.01)

(58) Field of Classification Search
CPC ....... H04W 12/06; H04W 4/08; H04W 4/005; H04W 12/08; H04L 63/101
(Continued)

(56) References Cited

U.S. PATENT DOCUMENTS

2006/0129809 A1   6/2006  Battagin et al.
2006/0294578 A1   12/2006  Burke et al.
(Continued)

FOREIGN PATENT DOCUMENTS

CN    101194464 A    6/2008
CN    101505550 B    8/2012
(Continued)

OTHER PUBLICATIONS

European Telecommunications Standards Institute (ETSI), "Machine-to-Machine Communications (M2M); OMA DM Compatible Management Objects for ETSI M2M," ETSI TS 103 092 V2.0.1, Jul. 2012, pp. 1-21, XP-014167769.
(Continued)

*Primary Examiner* — Dhaval V Patel
(74) *Attorney, Agent, or Firm* — Birch, Stewart, Kolasch & Birch, LLP

(57) ABSTRACT

A method for creating, by a terminal, an access control object instance in a wireless communication system, the method includes receiving from a server, an operation for adding an account of a specific server; adding the account of the specific server; and creating an access control object instance for an object instance having no access control object instance from among object instances stored in the terminal if the account of the specific server is added when the terminal has only one existing server account, wherein the server corresponding to the existing server account is set to be an access control owner of the created access control object instance.

8 Claims, 6 Drawing Sheets

Related U.S. Application Data

(60) Provisional application No. 61/859,791, filed on Jul. 30, 2013, provisional application No. 61/829,264, filed on May 31, 2013, provisional application No. 61/809,403, filed on Apr. 7, 2013, provisional application No. 61/752,997, filed on Jan. 16, 2013, provisional application No. 61/730,054, filed on Nov. 27, 2012, provisional application No. 61/719,964, filed on Oct. 30, 2012.

(51) Int. Cl.
   *H04W 4/70* (2018.01)
   *H04W 12/08* (2009.01)
   *H04L 29/06* (2006.01)
   *H04W 4/08* (2009.01)

(58) Field of Classification Search
   USPC .......................................................... 455/411
   See application file for complete search history.

(56) References Cited

U.S. PATENT DOCUMENTS

| | | |
|---|---|---|
| 2007/0250933 A1 | 10/2007 | Rantanen |
| 2009/0328180 A1 | 12/2009 | Coles et al. |
| 2010/0138537 A1* | 6/2010 | Ye .................. G06F 21/6218 709/225 |
| 2012/0066367 A1 | 3/2012 | Chai et al. |

FOREIGN PATENT DOCUMENTS

| | | |
|---|---|---|
| EP | 2 184 887 A1 | 5/2010 |
| EP | 2 249 512 A1 | 11/2010 |
| EP | 2 326 047 A1 | 5/2011 |
| KR | 10-2008-0017315 A | 2/2008 |
| KR | 10-2008-0035144 A | 4/2008 |
| KR | 10-2010-0011142 A | 2/2010 |
| KR | 10-2011-0040767 A | 4/2011 |
| KR | 10-1159343 B1 | 6/2012 |

OTHER PUBLICATIONS

Kim et al., "Authorization Update," Doc# OMA-DM-LightweightM2M-2012-0109-CR_Authorization_Update, Change Request, Nov. 27, 2012, 2 pages, XP064164252.

Open Mobile Alliance, "Lightweight Machine to Machine Architecture," Draft Version 1.0, OMA-AD-LightweightM2M-V1_0-20121010-D, Oct. 10, 2012, pp. 1-12, XP064164657.

Open Mobile Alliance, "OMA Device Management Protocol, OMA-TS-DM_Protocol-V2_0-20121023-D," Draft Version 2.0, Oct. 23, 2012, pp. 1-43, XP-064183548.

* cited by examiner

FIG. 3
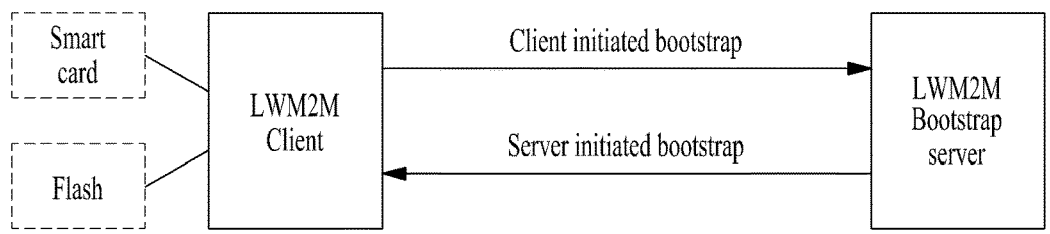
(a)
(b)
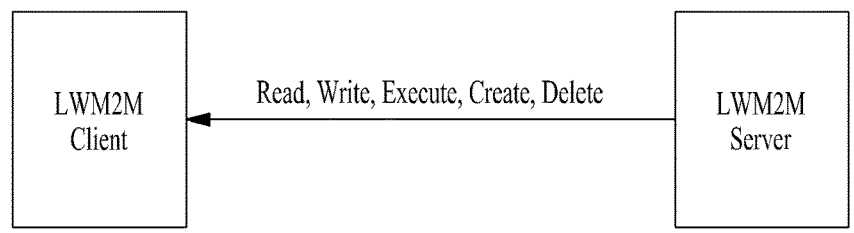
(c)
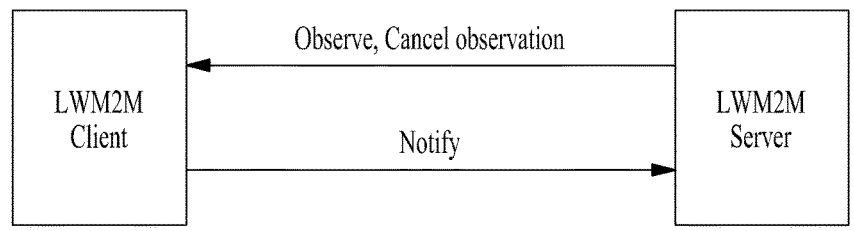
(d)

METHOD AND APPARATUS FOR AUTHENTICATING ACCESS AUTHORITY FOR SPECIFIC RESOURCE IN WIRELESS COMMUNICATION SYSTEM

CROSS-REFERENCE TO RELATED APPLICATIONS

This Application is a Continuation of U.S. patent application Ser. No. 14/377,997 filed on Aug. 11, 2014, which is the National Phase of PCT/KR2013/009742 filed on Oct. 30, 2013, which claims the benefit under 35 U.S.C. § 119(e) to U.S. Provisional Application Nos. 61/859,791 filed on Jul. 30, 2013, 61/829,264 filed on May 31, 2013, 61/809,403 filed on Apr. 7, 2013, 61/752,997 filed on Jan. 16, 2013, 61/730,054 filed on Nov. 27, 2012, and 61/719,964 filed on Oct. 30, 2012, all of which are hereby expressly incorporated by reference into the present application.

BACKGROUND OF THE INVENTION

Field of the Invention

The present invention relates to a method for authenticating access right for a specific resource in a wireless communication system and an apparatus therefor.

Discussion of the Related Art

M2M (Machine to Machine) communication technology has come into the spotlight with the advent of ubiquitous era. M2M can be used for various applications such as e-health, smart grid, smart home, etc. In these applications, M2M devices having various hardware specifications are used and thus a protocol which can accept any type of M2M device is needed. Accordingly, it is necessary to develop an application layer protocol suitable for resource-constrained M2M devices. This protocol is applicable to resource-constrained M2M devices and thus can also be applied to M2M devices having different specifications. A protocol suitable for resource-constrained M2M devices needs to access and deliver personal information stored in M2M devices according to application. For example, personal health information is stored in an M2M device such as a heartbeat monitoring apparatus. Accordingly, there is a need for an authority authentication technique for limiting resources and operations in an M2M device, which are accessible by a server. Therefore, the present invention provides a right acquisition method and a right authentication method suitable for resource-constrained M2M devices.

The present invention provides a method for authenticating, by an M2M client, an operation for a specific resource of an M2M server.

SUMMARY OF THE INVENTION

An object of the present invention devised to solve the problem lies in a method for authenticating access rights for an M2M server or a specific operation from the M2M server.

Another object of the present invention is to provide a method for supporting a right authentication procedure when a single M2M server environment is changed to a multi-M2M server environment in an M2M system.

The technical problems solved by the present invention are not limited to the above technical problems and those skilled in the art may understand other technical problems from the following description.

The object of the present invention can be achieved by providing a method for authenticating, by a terminal, access right for a resource in a wireless communication system, the method including: receiving, from a server, an operation for a specific object of the terminal, a specific object instance or a resource (hereinafter referred to as "operation target") belonging to the specific object instance; checking whether an access right for the operation target is granted for the server based on access right information associated with the operation target; determining whether at least one resource belonging to the operation target supports the operation based on at least one of the operation and the operation target when the access right for the operation target is granted, wherein the access right information associated with the operation target is specified for a specific object instance to which the at least one resource belongs.

Additionally or alternatively, the determining is performed only when the operation and/or the operation target correspond to a predetermined operation and/or a predetermined operation target.

Additionally or alternatively, a supportable operation may be defined according to the operation target.

Additionally or alternatively, the method further comprises: when the received operation is not supported for the operation target, transmitting, to the server, a response for notifying the server that the operation is not supported.

Additionally or alternatively, when the terminal has only a single server account, the access right of the server for the operation may be determined to be granted when and the server corresponds to the single server account.

Additionally or alternatively, the server may have access rights for all operations.

Additionally or alternatively, the method further comprises: when the access right for the operation target is not granted, transmitting, to the server, a response for notifying the server that access is rejected.

Additionally or alternatively, the method further comprises: when the access right for the operation target is granted, the operation is a predetermined operation and the operation target is for a specific object instance, performing the operation for the specific object instance without checking whether the at least one resource belonging to the operation target supports the operation.

Additionally or alternatively, the access right information associated with the operation target for the server may be obtained from an access control object instance associated with the specific object, the specific object instance or a resource belonging to the specific object instance.

Additionally or alternatively, the transmitting of the response may include notifying the server of an operation target causing access rejection.

In another aspect of the present invention, provided herein is a method for generating, by a terminal, access right for a resource in a wireless communication system, the method including: receiving from a server, an operation for adding an account of a specific server; adding the account of the specific server; and creating an access control object instance for an object having no access control object instance from among object instances stored in the terminal if the account of the specific server is added when the terminal has only one server account, wherein an access control owner of the generated access control object instance is the server corresponding to the only one server account.

Additionally or alternatively, the account of the specific server may be composed of a server security object instance having a specific value and a server object instance associated therewith.

Additionally or alternatively, the specific value may be information indicating that the specific server is not a bootstrap server.

Additionally or alternatively, the account of the specific server may be added through a bootstrap interface.

Additionally or alternatively, the server corresponding to the only one server account may have access rights for all object instances.

Additionally or alternatively, the access control owner may be able to modify the access control object instance.

The aforementioned technical solutions are merely parts of embodiments of the present invention and various embodiments in which the technical features of the present invention are reflected can be derived and understood by a person skilled in the art on the basis of the following detailed description of the present invention.

According to an embodiment of the present invention, it is possible to efficiently authenticate access right for an M2M server or a specific operation from the M2M server. In addition, reliability of the access right authentication procedure can be improved by performing access right authentication.

According to another embodiment of the present invention, it is possible to support the access right authentication procedure by generating an access control object instance for an object instance for which the access control object instance was not generated when a single M2M server environment is changed to a multi-M2M server environment in an M2M system.

The effects of the present invention are not limited to the above-described effects and other effects which are not described herein will become apparent to those skilled in the art from the following description.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIG. 3 illustrates interface models according to an embodiment of the present invention;

DETAILED DESCRIPTION OF THE EMBODIMENTS

Figure 1:
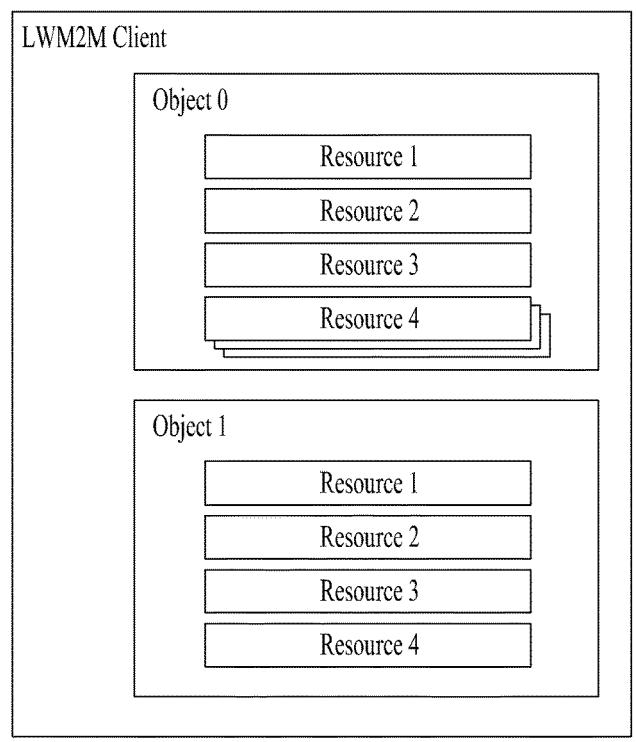
FIG. 1 illustrates a structure of data stored in an M2M client.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a device for M2M communication, that is, an M2M client or terminal may be fixed or mobile and includes a server for M2M communication, that is, an M2M server or a device which communicates with the server to transmit/receive user data and/or control information. The M2M client may be referred to as terminal equipment, MS (Mobile Station), MT (Mobile Terminal), UT (User Terminal), SS (Subscribe Station), wireless device, PDA (Personal Digital Assistant), wireless modem, handheld device, etc. In addition, the M2M server refers to a fixed station communicating with M2M terminals and/or other M2M servers and exchanges data and control information with M2M terminals and/or other M2M servers by communicating therewith.

A description will be given of the related art.

Device Management

Device management refers to management of device configuration and other managed objects of devices from the point of view of various management authorities. Device management includes, but is not restricted to setting initial configuration information in devices, subsequent updates of persistent information in devices, retrieval of management information from devices and processing events and alarms generated by devices.

Management Tree

Management tree refers to an interface by which a management server interacts with a client, e.g. by storing values in the management tree or retrieving values from the management tree and by manipulating the properties of the management tree, for example, access control lists. In the specification, the term management tree can be used interchangeably with the term device management tree or DM tree.

Management Object (MO)

A management object is a subtree of the management tree which is intended to be a (possibly singleton) collection of nodes which are related in some way. For example, ./DevInfo Nodes form a management object. A simple management object may consist of one single node.)

Device Management (DM) Server

A DM server may be an abstract software component in a deployed device management infrastructure that conforms to OMA device management enabler static conformance requirements specified for DM servers. The DM server serves as an end-point of DM client-server protocols and a DM server-server interface.

In the specification, the DM server may be mounted in a device, computer, etc. including a communication module, a processor module, etc.

Device Management (DM) Client

A DM client may be an abstract software component in a device implementation that conforms to OMA device management Enabler static conformance requirements specified for DM clients. The DM client serves as an end-point of the DM client-server protocols.

In the specification, the DM client may be mounted in a device including a communication module, a processor module, etc., which is an object of DM. The DM client may be implemented as a single device.

Access Control List (ACL)

An ACL refers to a list of DM server identifiers regarding a specific node in a management tree and access rights associated with each identifier.

Node

A Node is a single element in a management tree. There can be two kinds of nodes in a management tree: interior nodes and leaf nodes. The format property of a node provides information about whether the node is a leaf or an interior node.

Interior Node

An interior node is a node that may have child nodes, but cannot store any value allocated to a node, that is, a node value. The format property of an interior node is "node".

Leaf Node

A leaf node can store a node value, but cannot have child nodes. The format property of a leaf node is not "node".

Accordingly, all parent nodes must be interior nodes.

Permanent Node

A permanent node is permanent if the DDF property scope is set to permanent. If a node is not permanent, the node corresponds to a dynamic node. The permanent node cannot be dynamically generated or deleted by a server.

Dynamic Node

A dynamic Node is dynamic if the DDF property scope is set to dynamic or if the scope property is unspecified.

Sever Identifier

A server identifier refers to an OMA DM internal name for a DM server. A DM Server is associated with an existing server identifier in a device through OMA DM account.

ACL Properties and ACL Values

All terminals managed by a DM protocol have a single DM tree starting with a root node and the DM protocol performs management of terminals by manipulating each node of the DM tree. For example, to install downloaded software in a terminal, the software can be installed by executing a node "install" matched to the software. Each node may indicate simple information such as a numeral and complicated data such as graphical data or log data. In addition, a node may indicate a command such as "Execute", "Download" or the like.

Each node has properties of providing meta data related thereto. The properties include runtime which refers to duration of a node from generation of the node in the DM tree to extinction of the node. The runtime property includes an ACL, format, name, size, title, Tstamp, type and VerNo.

The ACL is mandatory such that both a terminal and a server need to implement the ACL in DM 1.3 protocol. The ACL specifies DM commands that a specific DM server can execute on a specific node. An unspecified command cannot be executed. In other words, the ACL refers to rights granted to a specific DM server for a specific node. In the DM protocol, the ACL is given to the server identifier of a DM server and is not assigned to a URI, an IP address and a DM server certificate. The server identifier is used as an identifier for authenticating the DM server in the DM protocol. Furthermore, the ACL can be provided as ACL property and an ACL value provided to the ACL property. In the specification, an ACL value may also be referred to as ACL information or information about the ACL. In DM 1.3 protocol, all nodes are defined to have the ACL property. All nodes having the ACL property are defined to have an empty ACL value or a non-empty ACL value.

The ACL has unique properties different from the runtime property. The unique properties include ACL inheritance. ACL inheritance refers to the concept of obtaining an ACL value for a node, which is included in a DM tree and does not have an ACL value, from the ACL value of the parent node of the node. If the parent node also does not have the ACL value, then the ACL value of the parent node is obtained from the ACL value of the parent node of the parent node. Since the root node corresponding to the highest node of the DM tree must have an ACL value in the DM protocol, the ACL value must be inherited. ACL inheritance is performed for all ACL values rather than being performed per DM command. Accordingly, ACL inheritance from the parent node of the node is carried out only when a node has an empty ACL value. That is, if an ACL value of a node specifies only "Add", unspecified "Get" is not inherited.

In the DM protocol, the root node has "Add=*&Get=*" as a basic value for ACL. Here, "*" denotes a wild card and means an arbitrary DM server. To get an ACL value, the DM server uses the "Get" command. The "Get" command regarding ./NodeA/Node1 gets an ACL value of ./NodeA/Node1. To change an ACL value, a "Replace" command is used. When "Replace" is executed on ./NodeA/Node1?prop=ACL" to set "Add=DMS1&Delete=DMS1& Get=DMS1", the ACL value is changed. In the DM protocol, an individual ACL entry cannot be changed and all ACL values can be changed. The right to get and change an ACL value is defined based on ACL. The right for an interior node and the right for a leaf node are differently defined.

Interior node: If the corresponding node has "Get" and "Replace" rights, it is possible to get and replace the ACL value of the corresponding node. "Replace" refers to the right to replace ACL values of all child nodes.

Leaf node: If a parent node of the corresponding node has "Replace" rights, the ACL value of the corresponding node can be replaced. The parent node needs to have "Get" rights in order to get the ACL of the corresponding node. Similarly, if the corresponding node has "Replace" rights, the ACL value of the node can be replaced. To replace the ACL value, the parent node of the corresponding node needs to have "Replace" rights.

The right to replace the ACL value of the corresponding node can be controlled by the ACL value of the parent node of the node irrespective of whether the node is an interior node or a leaf node. If an interior node has "Replace" rights, ACL values of all child nodes as well as the ACL value of the interior node can be replaced. Accordingly, if the root node has "Replace" rights, it is possible to have any right for all nodes in the DM tree. However, even when a parent node has "Replace" rights, specific rights such as "Get" and "Get" are not provided for a child node and right such as "Get" needs to be directly specified for the child node. Accordingly, the ACL value of the child node needs to be corrected prior to execution of a command and the ACL value of the child node is corrected by correcting ACL values of all nodes located before the corresponding child node. This is inconvenient and thus the DM protocol allows the ACL value of a corresponding node to be directly corrected without change of ACL values of intermediate nodes when the parent or ancestor node has "Replace" rights.

When a DM server generates a new node through command "Add", the generated node does not have an ACL value in general and thus gets the ACL value from the parent node thereof. However, when the generated node is an interior node and the parent node thereof does not have "Replace" rights, it is necessary to set the ACL value of the generated node at the same time when the node is generated to provide the right to manage the node.

The syntax for representing ACL values is defined in [DM-TND]. An exemplary ACL value is "Get=DMS1& Replace=DMS1&Delete=DMS2". Here, DMS1 and DMS2 are DM server identifiers and "Get", "Replace" and "Delete" are DM commands. Accordingly, DM server DMS1 can execute "Get" and "Replace" on a corresponding node and DM server DMS2 can execute "Delete" on the corresponding node. Here, Get=DMS1, Replace=DMS1 and Delete=DMS2 are ACL-entries and represent individual command rights of the DM servers. In other words, an ACL value is a set of individual ACL-entries and an ACL value of each node can include at least one ACL-entry.

DDF (Device Description Framework)

DDF is a specification for how to describe the management syntax and semantics for a particular device type. DDF provides information about MO, management functions and DM tree structure of terminals.

DM 1.3 Authentication

DM 1.3 performs authentication based on ACL. DM authentication is performed per DM command. If a DM server has transmitted a plurality of DM commands, a DM client (referred to as a DMC hereinafter) performs authentication prior to execution of the commands and executes only a DM command granted as a result of authentication.

DM Tree

A DM tree refers to a set of MO instances exposed by a DMC. The DM tree functions as an interface by a management server interacting with a client. For example, the management server can store and retrieve specific values from the DM tree and manipulate properties of the DM tree.

FIG. 1 illustrates a data structure stored in an M2M client. The M2M client (or terminal) may have entities corresponding to groups of resources referred to as "objects" corresponding to functions that can be implemented by the M2M client. An object identifier may be defined in object specification and an identifier that is not defined in the object specification may be set by an operator or manufacturer using the M2M system. A resource is an entity that stores data and may have a plurality of resource instances. Each object is generated and instantiated as an object instance by a specific operation and the M2M client can access the corresponding resource through the object instance.

In addition, information indicating an operation supported by a resource is included in or added to the resource. There are operations "Read", "Write", "Execute", "Write Attribute", "Discover", "Observe", etc.

Figure 2:
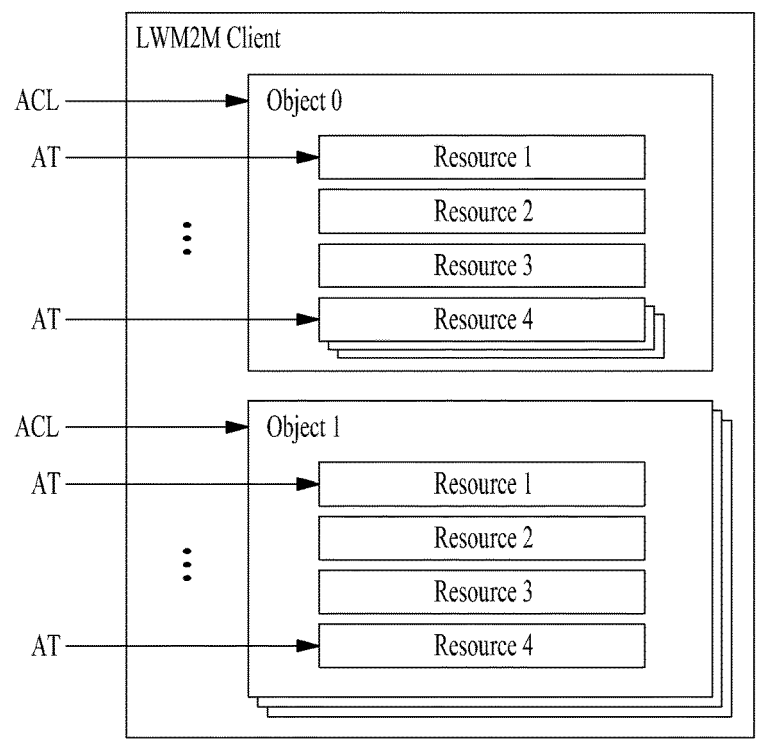
FIG. 2 illustrates a resource model according to an embodiment of the present invention.

FIG. 2 illustrates a resource model according to an embodiment of the present invention. An ACL (Access Control List) and an AT (Access Type) are assigned for control of access rights for resources to be used in the M2M system according to an embodiment of the present invention.

The ACL is assigned per resource corresponding to a specific function, that is, per object instance. Lower resources of each object instance are considered to be allocated the same ACL. That is, since the ACL is assigned per object instance, lower resources of each object instance have the same ACL.

Since an object instance is an entity corresponding to a resource group and is a group for executing a specific function, the same right should be granted for all resources in a group when the right for a specific function is granted for a specific server. When the same right is not granted, operation can be partially performed for a function. In this case, the function of the server becomes ambiguous and the meaning of granting authority is unclear. Accordingly, in an embodiment of the present invention, an ACL is assigned per object instance, as described above, to reduce overhead, compared to storage per resource, and to simplify an access right authentication procedure by using the same mechanism to find an ACL.

For reference, each object may be instantiated as a plurality of object instances.

The AT can be assigned per resource and define an access scheme supported by each resource. For example, when an access scheme is defined as operations, the AT can be defined as specific operations, for example, "Read", "Write" and "Execute".

The ACL and AT may be referred to by different terms. For example, the ACL can be referred to as access right and the AT can be referred to as a supportable operation.

Interface

A description will be given of an interface through which specific operations are transmitted between a server and a client (terminal) prior to description of embodiments of the present invention.

Four interfaces related to the present invention are present: 1) bootstrap, 2) device (client) registration, 3) device management and service enablement and 4) information reporting. Operations for the four interfaces can be classified into uplink operations and downlink operations. Operations of the interfaces are shown in the following table.

TABLE 1

| Interface | Direction | Logical Operation |
|---|---|---|
| Bootstrap | Uplink | Request Bootstrap |
| Bootstrap | Downlink | Write, Delete |
| Device(Client) Registration | Uplink | Register, Update, De-register |
| Device Management and Service Enablement | Downlink | Read, Create, Delete, Write, Execute, Write Attribute, Discover |
| Information Reporting | Downlink | Observe, Cancel Observation |
| Information Reporting | Uplink | Notify |

FIG. 3 illustrates the four interfaces. FIG. 3(a) illustrates an operation model for the bootstrap interface. For the bootstrap interface, operations include an uplink operation (i.e. client initiated bootstrap) called "Request bootstrap" and downlink operations (i.e. server initiated bootstrap) called "Write" and "Delete". These operations are used to initiate objects necessary for a client to register with one or more servers. Bootstrap is defined using a factory bootstrap (stored in a flash memory, for example) or a bootstrap (stored in a smart card) from the smart card.

FIG. 3(b) illustrates an operation model for "device (client) registration" interface. For the device registration interface, uplink operations called "Register", "Update" and "De-register" are present. "Register" is used to register information of a client in a server and "Update" is used to update the information or state of the client, registered in the server, periodically or according to an event generated in the client. "De-register" is operation of cancelling registration of the client with the server and the server can delete the information of the client according to "De-register".

FIG. 3(c) illustrates an operation model for the "device management and service enablement" interface. For the "device management and service enablement" interface, downlink operations called "Read", "Create", "Write", Execute", "Write Attribute" and "Discover" are present. These operations are used for interaction with resources, resource instances, objects and object instances of the client. "Read" operation is used to read the current values of one or more resources, "Write" operation is used to update values of one or more resources and "Execute" operation is used to initiate operation defined by a resource. "Create" and "Delete" operations are used to create and delete object instances. "Write Attribute" is used to set an attribute related to "Observe" operation and "Discover" is used to discover the corresponding attribute.

FIG. 3(d) illustrates an operation model for the "information reporting" interface. For the information reporting interface, downlink operations called "Observe" and "Cancel observation" and an uplink operation called "Notify" are present. The information reporting interface is used to transmit a new value related to a resource on the client to the server. "Observe" is used for the server to observe a specific resource when the server is interested in resource change and "Cancel observation" is used when the corresponding observation is no longer performed (when the server no longer wishes to know about resource change). "Notify" is used to notify the server of observation condition attributes set through "Write Attribute" when the observation condition attributes are satisfied.

A more detailed description will be given of the bootstrap interface according to an embodiment of the present invention.

The bootstrap interface is used to provide mandatory information to an M2M client such that the M2M client can perform "Register" operation with one or more M2M servers. There are four bootstrap modes supported by an M2M enabler.

Factory bootstrap: bootstrap information is preset in the M2M client.
Bootstrap from a smart card: the M2M client retrieves bootstrap information from the smart card.
Client initiated bootstrap: the M2M client requests bootstrap to an M2M bootstrap server and the M2M bootstrap server adds/deletes/updates bootstrap information of the M2M client.
Server initiated bootstrap: the M2M bootstrap server adds/deletes/updates the bootstrap information of the M2M client.

The M2M client can support at least one bootstrap mode specified in the bootstrap interface. The M2M bootstrap server can support all bootstrap modes specified in the bootstrap interface.

Bootstrap information refers to information that needs to be set by the M2M client to access the M2M server or M2M bootstrap server. The bootstrap information can be used prior to a bootstrap sequence or can be obtained as a result of the bootstrap sequence. The bootstrap information can be classified into two types, that is, bootstrap information for the M2M server and bootstrap information for the M2M bootstrap server.

The M2M client may have bootstrap information for at least one M2M server after the bootstrap sequence. In addition, the M2M client may have bootstrap information for the M2M bootstrap server. The bootstrap information for the M2M server is used for the M2M client to register with and access the M2M server.

The bootstrap information for the M2M server is composed of an M2M server account that is mandatory information and information of an object instance (e.g. right control, network connection object instance) that can be selectively present. The M2M server account can include at least an M2M server security object instance for which "bootstrap server" resource is set to "false" and an M2M server object.

The M2M client may be configured to use two or more M2M servers including a set of bootstrap information for the M2M servers. The bootstrap information for the M2M bootstrap server corresponds to an M2M bootstrap server account and may be used for the M2M client to access the M2M bootstrap server in order to acquire the bootstrap information for the M2M server. The bootstrap information for the M2M bootstrap server may be an M2M server security object instance for which "bootstrap server" resource is set to "true".

Data Model for Access Control

To reduce parsing process overhead and space overhead of an M2M device, server identifiers (IDs), ACL (or access right) and AT (or supportable operation) suitable for M2M environments are modeled.

Short Server ID

Information that needs to be included in an ACL must include information on a server and operations that the server can instruct. Server ID may be considerably long since the server ID is represented by a URI in general. Since an ACL needs to be represented per object instance and a long server ID is repeatedly used for object instances, the server ID may cause considerable space overhead depending on the number of object instances. Accordingly, the present invention proposes use of a short server ID having a fixed length (e.g. 2 bytes) for an ACL. The M2M client stores mapping relationship between short server IDs and server IDs and can find a short server ID corresponding to a server ID for an operation received from the server corresponding to the server ID and perform authentication through the corresponding ACL using the short server ID.

TABLE 2

| Identifier | Semantics | Description |
| --- | --- | --- |
| Short Server ID | 16-bit unsigned integer | Short integer ID allocated by an LWM2M (Lightweight M2M, referred to as LWM2M hereinafter) bootstrap server. This identifier uniquely identifies each M2M server configured for the M2M client. |

Access Control List (ACL) or Access Right

An ACL is allocated per object instance and corresponds to a list of ACL entries that designate access right for M2M servers. An ACL entry can be represented by a short server ID and access right of the corresponding server. A short server ID and an access right value are set to fixed short lengths to improve space overhead and processing efficiency during an authentication procedure. With regard to access right, a single bit value is allocated per M2M operation such that a specific operation is authenticated by reading only a single bit value to thereby improve processing efficiency. Default ACL entries for servers other than servers on the ACL can be set, and the M2M client can find a specific short server ID (e.g. 0x0000) when receiving operations with respect to all servers which are not on the ACL and authenticate the operations using the corresponding access right.

TABLE 3

| Field | Description |
| --- | --- |
| ACL | List of ACL entries |
| ACL entry | Composed of a short server ID and |

TABLE 3-continued

| Field | Description |
| --- | --- |
| | access right<br>Access right is composed of<br>$1^{st}$ lsb (least significant bit): Read<br>$2^{nd}$ lsb: Write<br>$3^{rd}$ lsb: Execute<br>Other bits are reserved for future use. |

The ACL entry shown in Table 3 is exemplary and can be set to different values.

Access Type (AT) or Supportable Operations

AT can designate operations supported by resources. One bit is mapped to one operation in the same manner as access right of ACL entry.

TABLE 4

| Field | Description |
| --- | --- |
| Access Type | $1^{st}$ lsb: Read<br>$2^{nd}$ lsb: Write<br>$3^{rd}$ lsb: Execute<br>Other bits are reserved for future use |

Access type shown Table 4 is exemplary and can be se to different values.

Method for Acquiring Access Right

Figure 4:
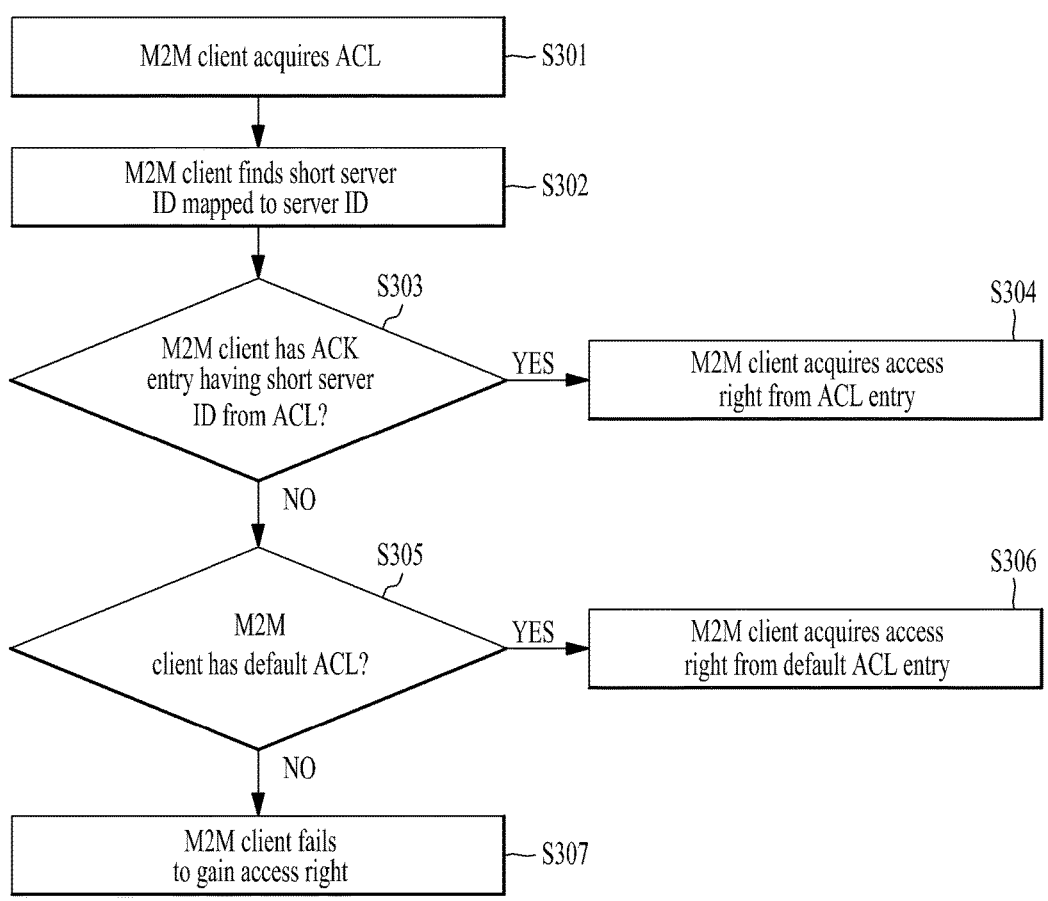
FIG. 4 is a flowchart illustrating a method for acquiring access rights according to an embodiment of the present invention.

FIG. 4 is a flowchart illustrating a method for acquiring access right according to an embodiment of the present invention.

An M2M client may acquire an ACL (S301). The M2M client may obtain the ACL of an object instance to which an entity (object instance or resource) that an M2M server attempts to access belongs.

The M2M client may find a short server ID to which the server ID of the M2M server is mapped (S302). The M2M client can detect the short server ID corresponding to the M2M server ID from a place (e.g. account) in which mapping information is stored.

The order of steps S301 and S302 may be changed.

The M2M client may determine whether the ACL includes an ACL entry having the short server ID (S303).

The M2M client may find the ACL entry including the short server ID from the ACL acquired in step S301. The M2M client can obtain access right corresponding to the short server ID through the ACL entry.

The M2M client may acquire right to access the entity that the M2M server attempts to access from the ACL entry (S304). When the M2M client has found the access right in step S303, the M2M client can obtain the corresponding access right.

It is checked whether the M2M client has a default ACL entry (S305). When the M2M client cannot find the ACL entry in step S303, the M2M client can check whether the default ACL entry is present.

When the default ACL entry is present, the M2M client may acquire access right from the default ACL entry (S306).

When the default ACL entry is not present, the M2M client fails to acquire the right to access the entity that the M2M server attempts to access (S307). That is, the M2M server has no right to access the entity.

Authorization

A method for authenticating access right according to another embodiment of the present invention is described depending on the target of a corresponding operation, that is, a resource, object instance or object. As described below, supportable operations can be defined depending on the target of an operation, that is, a resource, object instance or object.

Operation for a Resource

Figure 5:
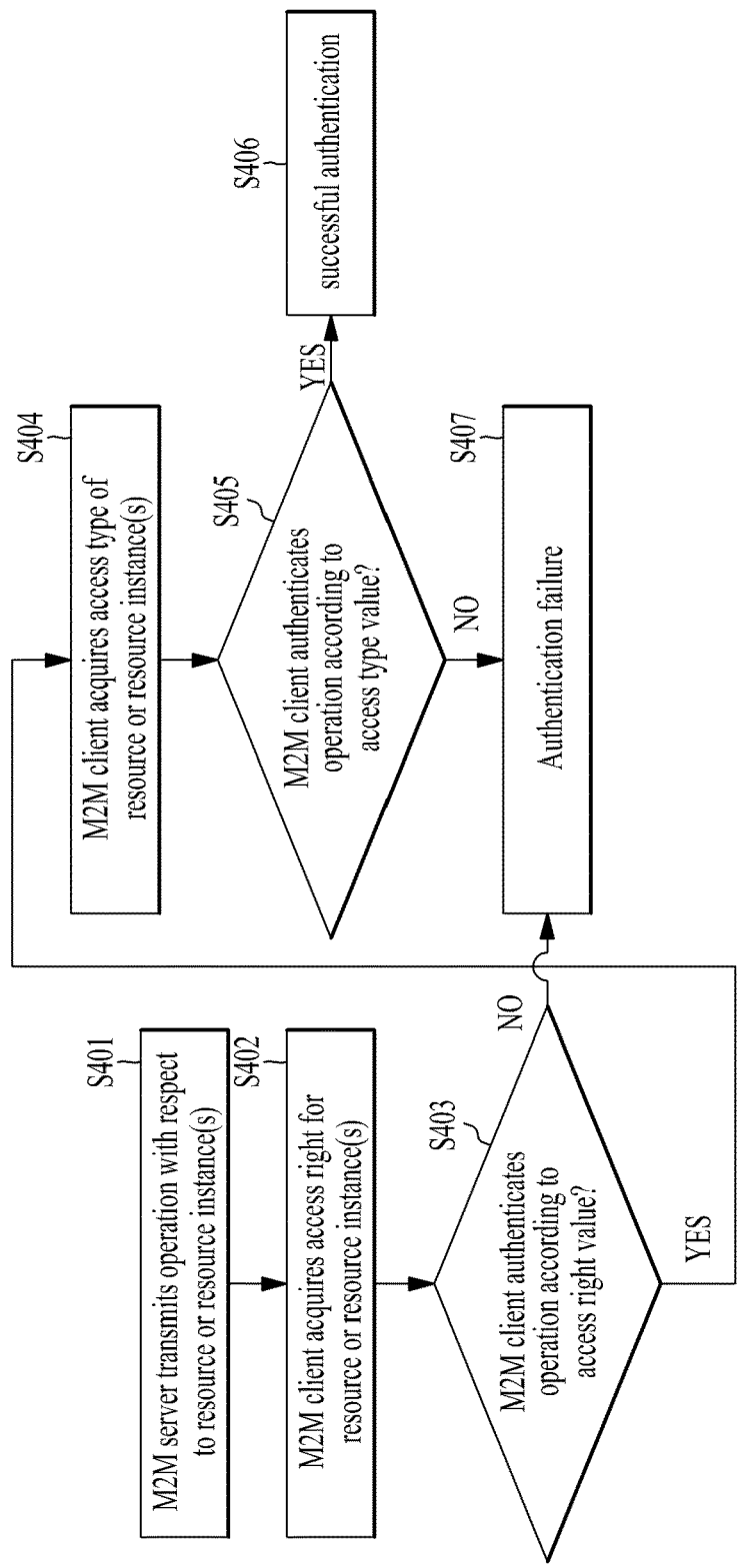
FIG. 5 is a flowchart illustrating an authentication procedure in the case of an operation with respect to a resource according to another embodiment of the present invention.

FIG. 5 is a flowchart illustrating an authentication procedure in the case of an operation with respect to a resource according to another embodiment of the present invention.

An M2M server may transmit an operation with respect to a resource (S401). The M2M server can transmit the operation targeting a specific resource to an M2M client.

The M2M client may acquire access right of the M2M server to access the specific resource (S402). The M2M client may acquire the access right for the specific resource through the above-described access right acquisition method.

The M2M client may determine whether the operation is granted by the acquired access right (S403). The M2M client may check whether the operation is granted for the M2M server using the access right obtained in step S402. If the M2M client fails to obtain the access right in step S402, the corresponding operation cannot be performed.

The M2M client may acquire access type of the resource (S404).

The M2M client may determine whether the operation is granted by the acquired access type (S405). The M2M client checks whether the access type obtained in step S4040 supports the operation.

When the obtained access type supports the operation, authentication of the operation is successfully ended (S406). Upon successful authentication, the M2M client may perform the operation and transmit a response to the operation if a response is needed.

When the access type does not support the operation, authentication of the operation fails (S407). In this case, the M2M client may transmit an authentication failure message. Here, the M2M client can represent whether authentication failure is caused by access right error or resource access type error through the authentication failure message.

Operation for an Object Instance

Figure 6:
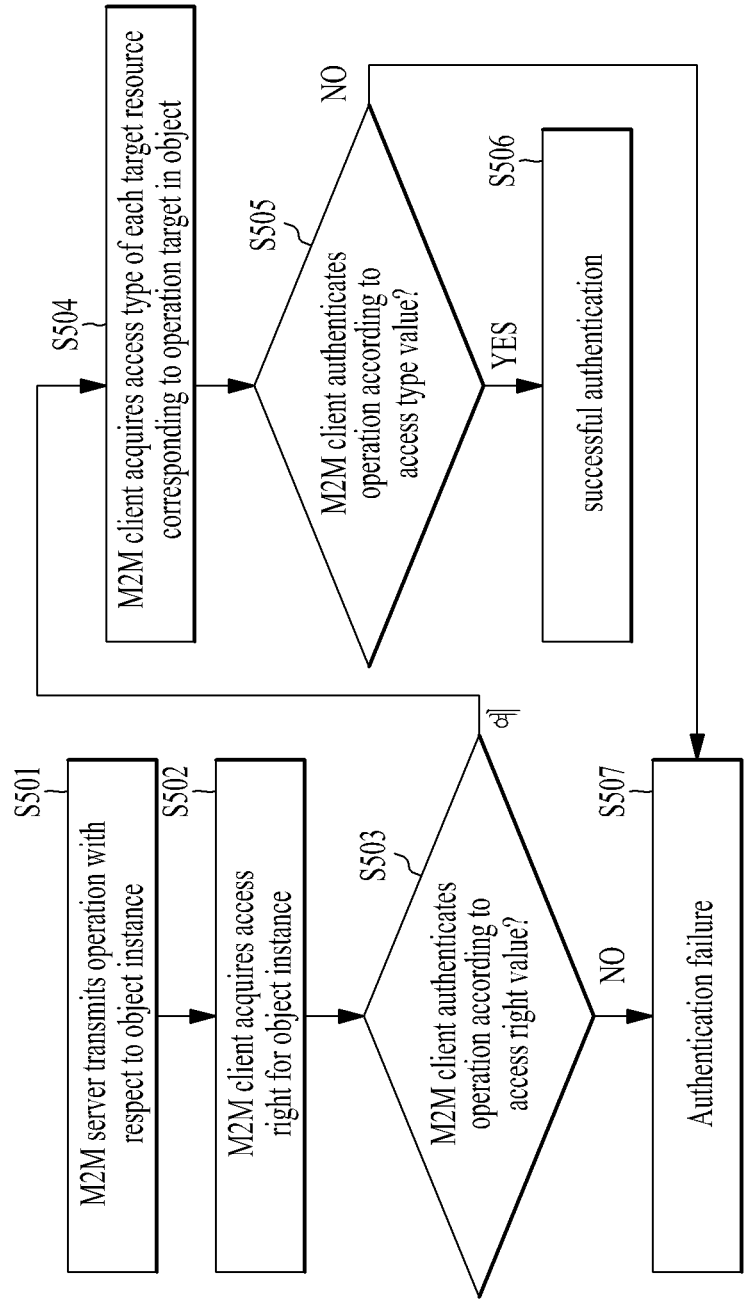
FIG. 6 is a flowchart illustrating an authentication procedure for an operation with respect to an object instance according to another embodiment of the present invention.

FIG. 6 is a flowchart illustrating an authentication procedure for an operation with respect to an object instance according to another embodiment of the present invention.

The M2M server may transmit an operation with respect to an object instance to the M2M client (S501).

The M2M client may acquire access right of the M2M server to access the object instance (S502). The M2M client may obtain the access right through the above-described access right acquisition method.

The M2M client may determine whether the operation is granted by the acquired access right (S503). The M2M client may determine whether the operation is supportable through the access right obtained in step S502. If the M2M client fails to acquire the access right in step S502, the operation cannot be performed.

The M2M client may acquire access type of the resource corresponding to the target of the operation from among resources included in the object instance (S504).

The M2M client may determine whether the operation is granted by the acquired access type (S505). The M2M client may check whether the resource corresponding to the target of the operation, which is included in the object instance, supports the operation based on the acquired access type.

When the resource corresponding to the target of the operation supports the operation, the authentication procedure is successfully ended (S506). Upon successful authentication, the M2M client may perform the operation with respect to the resource and transmit a response to the operation to the M2M server if the response is needed.

However, when the resource corresponding to the target of the operation does not support the operation, the authentication procedure ends in failure (S507). In this case, the M2M client may transmit an authentication failure message to the M2M server. Here, the M2M client can represent whether authentication failure is caused by access right error or access type error through the authentication failure message.

Steps S504 to S507 may be performed on all resources included in the object instance. That is, the operation can be performed for authenticated resources and/or a response to the operation can be transmitted to the M2M server. The operation is not performed for resources which fail to be authenticated and a failure message can be reported.

In another embodiment, the operation may not be performed when any resource included in the object resource does not support the operation. In this case, authentication for all resources included in the object instance ends in failure and the failure message can be transmitted to the M2M server. Here, the failure message can indicate whether authentication failure is caused by access right error or access type error and information about the resource having an error.

Access Control Handling

In the case of access control, when only one M2M server is present in the M2M system or there is a single M2M server with which the M2M client is registered (simply, when a single server is present), it is proper that the server should have rights to access all operations. Here, even if the server has the access rights, the M2M client may have an access control object instance or the access control object instance may not be present.

When the Access Control Object Instance is Present

When a single server is present, the M2M client sets the access control object instance to have access right for operation "Create" transmitted from the server or an object instance provided through bootstrapping. Here, the M2M client can set the server as an owner (entity capable of setting access control) for access control.

When the Access Control Object Instance is Not Present

When a single server is present, the server does not have the access control object instance. However, if a new server is added (i.e. when a server account related object instance is added), the M2M client can automatically generate the access control object instance for the existing server. Here, ACL information can be set such that the corresponding server has rights for the existing resources. That is, the M2M client can set the existing server to the owner of the right to control access of the access control object instance.

Access Control Options

Access of all M2M servers is permitted irrespective of whether multiple servers are present. That is, the M2M client may not undergo access right authentication.

Access Control Method

A description will be given of an access control method according to another embodiment of the present invention.

Access Right Acquisition

When the M2M client has an M2M server object instance, the M2M client has the rights to access corresponding resources without undergoing access control for the corresponding single M2M server, that is, without checking the access control object instance.

If the M2M client has two or more M2M server object instances, then the M2M client finds the ACL of a corresponding server with respect to an object instance to be accessed or an object instance including a resource to be accessed in access control object instances. If the ACL includes the access right corresponding to the corresponding M2M server ID, then the corresponding M2M server has the access right. If the ACL entry of the corresponding M2M server ID is not present, the M2M client checks whether the ACL includes access right allocated to a default server ID. When the default server ID is present, the corresponding M2M server has access right of the default server ID. When the access right corresponding to the M2M server ID and the access right of the default server ID are not present, the corresponding M2M server does not have the right to access the corresponding object instance or resource.

Access Control Object

An access control object is used to check whether an M2M server has the access right to perform operations. Each access control object instance includes an ACL for a specific object instance in the M2M client.

TABLE 5

| Resource Name | Resource ID | Supported Operations | Multiple Instances? | Mandatory? | Data Type | Range or Enumeration | Units | Descriptions |
|---|---|---|---|---|---|---|---|---|
| Object ID | 0 | R | Single | Mandatory | Integer | 1-65534 | — | The Object ID and the Object Instance ID are applied for |
| Object Instance ID | 1 | R | Single | Mandatory | Integer | 1-65535 | — | LWM2M identifiers. |
| ACL | 2 | R, W | Multiple | Optional | Integer | 8-bit | — | Resource instance ID must be the short server ID of a certain LWM2M server which has an access right. Resource instance ID 0 is for default short server ID. Setting each bit means the LWM2M server has the access right for that operation. The bit order is specified as below. $1^{st}$ lsb: Read, Observe, Discover, Write Attribute $2^{nd}$ lsb: Write $3^{rd}$ lsb: Execute |

TABLE 5-continued

| Resource Name | Resource ID | Supported Operations | Multiple Instances? | Mandatory? | Data Type | Range or Enumeration | Units | Descriptions |
|---|---|---|---|---|---|---|---|---|
| Access Control Owner | 3 | R, W | Single | Mandatory | Integer | 1-65365 | — | $4^{th}$ lsb: Create<br>$5^{th}$ lsb: Delete<br>Other bits are reserved for future use<br>Short server ID of a certain LWM2M server. Only this LWM2M server can manage these resources of the object instance.<br>Value MAX_INTEGER=0xFFFF is reserved for the access control object instances created during bootstrap procedure. |

Authentication Procedure

To pass an authentication procedure for an operation transmitted from an M2M server, the following needs to be satisfied. First, the M2M server needs to have the right (i.e. access right) to perform the operation transmitted for a corresponding resource (e.g. object instance or resource). Secondly, the corresponding resource needs to support the transmitted operation. An access right authentication procedure according to an embodiment of the present invention is performed through two steps, that is, in a hierarchical structure.

The M2M client notifies the M2M server that the transmitted operation is not performed due to a certain resource by transmitting an error message to the M2M server when the right to access the corresponding resource is not present and by transmitting information about the corresponding resource to the M2M server when the corresponding resource does not support the operation. The authentication procedure is differently performed for three levels, that is, a resource, an object instance and an object.

Operation for a Resource

If the M2M server accesses an individual resource, that is, the M2M server transmits an operation with respect to the individual resource to the M2M client, then the M2M client can acquire the access right of the M2M server for an object instance including the individual resource according to the aforementioned access right acquisition method and check whether the access right is granted to perform the operation.

When the operation is not granted, the M2M client needs to transmit an error code indicating "grant of access right is rejected" to the M2M server.

When the operation is granted, the M2M client verifies whether the individual resource supports the operation.

If the operation is not supported by the individual resource, then the M2M client needs to transmit an error code indicating "operation is not supported" to the M2M server.

When the operation is supported by the individual resource, the M2M client can perform the operation.

Operation for an Object Instance

When the M2M server accesses an object instance, that is, the M2M server transmits an operation with respect to the object instance to the M2M client, the M2M client can acquire the access right of the M2M server for the object instance according to the aforementioned access right acquisition method and check whether the access right is granted to perform the operation.

When the operation is not granted, the M2M client needs to transmit an error code indicating "grant of access right is rejected" to the M2M server.

When the operation is granted, the M2M client can perform the following processes based on the operation.

For "Write" operation, the M2M client can perform the operation with respect to the object instance only when all resources with respect to the transmitted operation support "Write" operation. If any resource (with respect to the transmitted operation) does not support "Write" operation, then the M2M client can notify the M2M server of resources that do not support the operation by transmitting an error code indicating "operation is not supported" to the M2M server.

For "Read" operation, the M2M client can retrieve all resources other than resources that do not support "Read" operation and transmit information about the retrieved resources to the M2M server.

For "Create" operation, the M2M client can perform the operation with respect to the object instance only when all resources with respect to the transmitted operation support "Write" operation and all mandatory resources are specified. If any resource (with respect to the transmitted operation) does not support "Write" operation, then the M2M client can transmit an error code indicating "operation is not supported" to the M2M server to notify the M2M server of resources that do not support the operation. When all mandatory resources are not specified, the M2M client can transmit error code "Bad Request" to the M2M server.

For "Delete", "Observe", "Write Attribute" or "Discover" operation, the M2M client needs to perform the operation. That is, the M2M client needs to perform "Delete", "Observe", "Write Attribute" or "Discover" operation without checking whether the operation with respect to the object instance is supported by all resources belonging to the object instance.

For an operation other than the aforementioned operations, the M2M client need not perform the operation and needs to transmit an error code of "operation is not supported" to the M2M server.

Whether the M2M server has the access right for the object instance is determined through the aforementioned access right acquisition method. Then, whether individual resources belonging to the object instance support the operation is checked. This process is performed depending upon the operation type.

Operation for an Object

Operations for objects are defined according to operation type.

When the M2M server transmits "Read" operation through an object, that is, the M2M server transmits "Read" operation with respect to the object to the M2M client, the M2M client can collect information on object instances for which the M2M server has the access right from among (lower) object instances belonging to the object and transmit the collected information to the M2M server. Whether the M2M server has the access right is determined according to the aforementioned access right acquisition method.

The information on the object instances for which the M2M server has the access right refers to information on resources searched by the M2M client except for resources that do not support "Read" operation.

When the M2M server transmits "Create" operation through an object, that is, the M2M server transmits "Create" operation with respect to the object to the M2M client, the M2M client can check whether the M2M server has the access right for the object according to the aforementioned access right acquisition method.

When the M2M server has the access right for the object, the M2M client can perform the operation only when all resources transmitted according to the operation support "Write" operation and all mandatory resources are specified. If any resource (with respect to the transmitted operation) does not support "Write" operation, the M2M client can notify the M2M server of resources that do not support the operation by transmitting error code of "operation is not supported" to the M2M server. If all mandatory resources are not specified, the M2M client can transmit error code "Bad Request" to the M2M server. That is, the M2M client notifies the M2M server that the operation according to the M2M server is incorrect.

In the case of "Discover" operation, the M2M client needs to perform the operation. That is, the M2M client does not check whether the M2M server has the access right for all lower object instances of the corresponding object and does not check whether all resources belonging to the object instances support "Discover" operation.

In the case of "Observe" or "Write Attributes" operation, the M2M client needs to perform the operation. That is, for "Observe" or "Write Attributes" operation, the M2M client does not check whether the M2M server has the access right for all lower object instances of the object and whether all resources belonging to the object instances support "Observe" or "Write Attributes" operation.

For an operation other than the aforementioned operations, the M2M client should not perform the operation and can transmit an error code of "operation is not supported" to the M2M server.

Whether the M2M server has the access right for the object is determined through the aforementioned access right acquisition method according to a specific operation for the object. Then, whether individual resources belonging to object instances of the object support the operation is checked. This process is performed depending upon the operation type. For a specific operation with respect to the object, whether the M2M server has the access right and whether the specific operation is supported may not be checked.

Notify Consideration

When the M2M client needs to transmit "Notify" including an object instance or a resource to the M2M server, the M2M client should check whether the M2M server is granted for "Read" operation. When the M2M server is not granted, the M2M client should not transmit "Notify" and can perform "Cancel observation" operation. When "Observe" operation targets an object, the M2M client should not perform "Cancel observation" operation. The M2M client can perform "Cancel observation" when "Observe" operation is targeted for an object instance or a resource.

Supported Operation (Access Type) Consideration

Even if the corresponding M2M server has the access right for a specific operation (command or logical operation), the M2M server cannot perform the specific operation for a corresponding resource. An operation supported by the resource is defined for the resource. The M2M client determines whether the M2M server can perform the corresponding operation for the resource in consideration of the operation supported by the resource.

Auto Configuration

If the M2M client has a single M2M server object instance, the M2M client does not undergo the access right acquisition procedure, that is, the M2M client does not check access control object instances and the M2M server has access right for the corresponding resource.

Access Control Related Operation According to Addition of M2M Server Account

A description will be given of operation of the M2M client when an M2M server account is added to an M2M server account existing in the M2M client according to another embodiment of the present invention.

An access control object instance for object instances existing in the M2M client is generated or corrects the access control object instance when the access control object instance already exists. Object ID of a present object instance is set to an object ID resource value in the access control object instance and object instance ID of the present object instance is set to an object instance ID resource value. ACL resources in the access control object instance are set such that the existing M2M server (identifier indicating the M2M server) has the access right for the corresponding object instance. The existing M2M server (identifier indicating the M2M server) is set to an access control owner in the access control object instance.

More specifically, if a new M2M server account is added when the M2M client has only one M2M server account, the M2M client can generate or correct access control object instances for all object instances therein, more preferably, object instances other than a server security object instance and access control object instance. In this case, the access control object instances are generated or corrected according to the following rule.

Access control owner is set to the existing M2M server.

The existing M2M server is set to have all access rights.

A description will be given of operation of the M2M client when a new M2M server account is added to two or more M2M server accounts existing in the M2M client according to another embodiment of the present invention.

When two M2M server accounts are present, an access control object instance related to an object instance is automatically generated when a specific M2M server generates the object instance. The access control object instance is set as follows.

Object ID and object instance ID resources have object ID and object instance ID of an object instance generated according to "Create" operation.

ACL resources are set such that the M2M server (identifier indicating the M2M server) that performs "Create" operation has all access rights.

The access control owner is set to the M2M server (identifier indicating the M2M server).

When an M2M server account is added to two M2M server accounts, an additional procedure is not present.

More specifically, when the M2M client has two or more M2M server accounts and one of the M2M servers transmits "Create" for a specific object instance, the M2M client can generate an access control object instance for the generated object instance. In this case, the access control object instance is generated or corrected according to the following rule.

Access control owner is set to the M2M server that transmits "Create".
The M2M server is set to have the access right.

M2M Server Account Addition

An M2M server account is composed of an M2M server security object instance (for which bootstrap server resource is set to "false") and an M2M server object instance related thereto. For reference, an M2M bootstrap server account is composed of an M2M server security object instance for which the bootstrap server resource is set to "true".

The M2M server account is included in M2M server bootstrap information which is used for the M2M client to register with the M2M server or to access the M2M server.

The M2M server bootstrap information is set to the M2M client through the bootstrap interface. Bootstraps can be classified into factory bootstrap, bootstrap according to a smartcard, client-initiated bootstrap and server-initiated bootstrap.

A description will be given of the server security object (LWM2M security object) and server object (LWMWM server object) instance.

The M2M server security object (or object instance) provides a key material of the M2M client suitable to access a specified M2M server. One object instance is recommended to address the M2M bootstrap server. While resources of the M2M server security object can be changed by the M2M bootstrap server or bootstrap from a smartcard, the resources cannot be accessed by any other M2M servers.

TABLE 6

| Object | Object ID | Object URN | Multiple Instances? | Mandatory? |
|---|---|---|---|---|
| LWM2M Security | 0 | | Multiple | Mandatory |

TABLE 7

| Resource Name | Resource ID | Supported Operations | Multiple Instances? | Mandatory? | Type | Range or Enumeration | Units | Descriptions |
|---|---|---|---|---|---|---|---|---|
| LWM2M Server URI | 0 | | Single | Mandatory | String | 0-255 bytes | — | Uniquely identifies the LWM2M server or LWM2M bootstrap server, and is in the form: "coaps://host:port", where host is an IP address or FQDN, and port is the UDP port of the server. |
| Bootstrap-Server | 1 | | Single | Mandatory | Boolean | | — | Determines if the current instance concerns a LWM2M bootstrap server (true) or a standard LWM2M server (false) |
| Security Mode | 2 | | Single | Mandatory | Integer | 0-3 | — | Determines which security mode of DTLS is used 0: Pre-Shared Key mode 1: Raw Public Key mode 2: Certificate mode 3: NoSec mode |
| Public Key or Identity | 3 | | Single | Mandatory | Opaque | | — | Stores the LWM2M client's certificate (certificate mode), public key (RPK mode) or PSK identity (PSK mode). |
| Server Public Key or Identity | 4 | | Single | Mandatory | Opaque | | — | Stores the LWM2M server's or LWM2M bootstrap server's certificate (Certificate mode), public key (RPK mode) or PSK identity (PSK mode). |
| Secret Key | 5 | | Single | Mandatory | Opaque | | — | Stores the secret key or private key of the security mode. This resource must only be changed by a bootstrap server and must not be readable by any server. |
| Short Server ID | 6 | | Single | Optional | Integer | 1-65535 | — | This identifier uniquely identifies each LWM2M server configured for the LWM2M client. This resource must be set when the bootstrap server resource has false value. Default short server ID (i.e. 0) must not be used for identifying the LWM2M server. |

TABLE 7-continued

| Resource Name | Resource ID | Supported Operations | Multiple Instances? | Mandatory? | Type | Range or Enumeration | Units | Descriptions |
|---|---|---|---|---|---|---|---|---|
| ClientHold-OffTime | 7 | | Single | Mandatory | Integer | | s | Relevant information for a bootstrap server only. The number of seconds to wait before initiating a client initiated bootstrap once the LWM2M client has determined it should initiate this bootstrap mode |

A description will be given of an M2M server object (or object instance). The M2M server object provides data related to an M2M server. The bootstrap server does not have an object instance related thereto.

TABLE 8

| Object | Object ID | Object URN | Multiple Instances? | Mandatory? |
|---|---|---|---|---|
| LWM2M Server | 1 | | Multiple | Mandatory |

TABLE 9

| Resource Name | Resource ID | Supported Operations | Multiple Instances? | Mandatory? | Data Type | Range or Enumeration | Units | Descriptions |
|---|---|---|---|---|---|---|---|---|
| Short Server ID | 0 | R | Single | Mandatory | Integer | 1-65535 | — | Used as link to associate server object instance. |
| Lifetime | 1 | R, W | Single | Mandatory | Integer | | s | Specify the lifetime of the registration in seconds. |
| Default Minimum Period | 2 | R, W | Single | Optional | Integer | | s | The default value the client should use for the minimum period of an observation in the absence of this parameter being included in an observation. If this resource doesn't exist, the default value is 1. |
| Default Maximum Period | 3 | R, W | Single | Optional | Integer | | s | The default value the client should use for the maximum period of an observation in the absence of this parameter being included in an observation. |
| Disable | 4 | E | Single | Optional | | | | If this resource is executed, this LWM2M server object is disabled for a certain period defined in the disabled timeout resource. After receiving "execute" logical operation, client must send response of the operation and perform de-registration process, and underlying network connection between the client and server must be disconnected to disable the LWM2M server account. After the above process, the LWM2M Client must not send any message to the server and ignore all the messages from the LWM2M server for the period. |
| Disable Timeout | 5 | R, W | Single | Optional | Integer | | s | A period to disable the server. After this period, the LWM2M client must perform registration process to the server. If this resource is not |

TABLE 9-continued

| Resource Name | Resource ID | Supported Operations | Multiple Instances? | Mandatory? | Data Type | Range or Enumeration | Units | Descriptions |
|---|---|---|---|---|---|---|---|---|
| | | | | | | | | set, a default timeout value is 86400 (1 day). |
| Notification Storing When Disabled or Offline | 6 | R, W | Single | Mandatory | Boolean | | | If true, the LWM2M client stores "Notify" logical operations to the LWM2M server while the LWM2M server account is disabled or the client is offline. After the LWM2M server account is enabled or the client is online, the LWM2M Client reports the stored "Notify" logical operations to the server. If false, the LWM2M client discards all the "Notify" logical operations or temporally disables the Observe function while the LWM2M server is disabled or the client is offline. The default value is true. The maximum number of storing notification per server is up to the implementation. |
| Binding | 7 | R, W | Single | Mandatory | String | | | This resource defines the transport binding configured for the client. If the client supports the binding specified in this resource, the client must use that for current binding and mode. |
| Registration Update Trigger | 8 | E | Single | Mandatory | | | | If this resource is executed the LWM2M client shall perform an "Update" logical operation with this LWM2M Server using the current transport binding and mode. |

Selective Resource Discovery

A description will be given of a discovery function according to another embodiment of the present invention.

When the M2M server and the M2M client share information (e.g. M2M object specification or information corresponding thereto) about a specific resource group (e.g. object in M2M), a method for checking whether the corresponding resources have been implemented is needed because all resources of the resource group need not be implemented. Resources include mandatory resources and optional resources and the M2M server needs to know resources actually implemented in the M2M client from among optional resources.

Accordingly, the M2M server needs to confirm an actually implemented resource in a specific resource group of the M2M client. For this, the M2M server can inquire of the M2M client about an actually implemented optional resource in the specific resource group and the M2M client can transmit information about the optional resource to the M2M server as an answer to the inquiry.

Target of Optional Resource Implementation Inquiry
A specific resource group or all resource groups supported by the M2M client
Response to Optional Resource Implementation Inquiry
Implemented resource(s) of a specific resource group when the specific resource group is targeted or implemented resource group(s) from among all resource groups supported by the M2M client when all resource groups are targeted, or Information on implemented resource(s) of a specific resource group when the specific resource group is targeted or implemented resource group(s) from among all resource groups supported by the M2M client This function has the effect that formats of all resource groups supported by the M2M client are shared through pre-shared information and partial information obtained through discovery without transmitting information on the formats of all resource groups.

A brief description will be given of operations and objects (instances) described in the aforementioned embodiments and used in the specification.

Read

"Read" operation is used to access (read) values of individual resources, resource instances of an array, object instances or all object instances of an object and has the following parameters.

TABLE 10

| Parameter | Required | Default Value | Notes |
|---|---|---|---|
| Object ID | Yes | — | Indicates the object. |
| Object Instance ID | No | — | Indicates the object instance to read. If no object instance ID is indicated, then the object instances of objects, which the server is authorized to, are returned. |

TABLE 10-continued

| Parameter | Required | Default Value | Notes |
|---|---|---|---|
| Resource ID | No | — | Indicates the resource to read. If no resource ID is indicated, then the whole object instance is returned. |

Discover

"Discover" operation is used to discover individual resources, object instances and attributes (parameters) set for an object. "Discover" operation can be used to discover resources implemented in an object. Returned values correspond to a list of resources, which includes attributes of the resources, and conform to application/link-format CoRE Links format of RFC6690. "Discover" operation has the following parameters.

TABLE 11

| Parameter | Required | Default Value | Notes |
|---|---|---|---|
| Object ID | Yes | — | Indicates the object. |
| Object Instance ID | No | — | Indicates the object instance. |
| Resource ID | No | — | Indicates the resource. |

As specific functions of "Discover" operation, information on which resource is implemented is returned when only the object ID from among the aforementioned parameters is specified, observe parameters set for a specified object instance can be returned when the object ID and the object instance ID from among the parameters are specified, and observe parameters set for a specific resource can be returned when the object ID, object instance ID and resource ID from among the parameters are specified.

Write

"Write" operation is used to change (write) a plurality of resource values in a resource, resource instances of an array or an object instance. "Write" operation permits a plurality of resources in the same object instance to be changed according to one command. That is, "Write" operation can access object instances (as well as individual resources). "Write" operation has the following parameters.

TABLE 12

| Parameter | Required | Default Value | Notes |
|---|---|---|---|
| Object ID | Yes | — | Indicates the object. |
| Object Instance ID | Yes | — | Indicates the object instance to write. |
| Resource ID | No | — | Indicates the resource to write. The payload is the new value for the resource. If no resource ID is indicated, then the included payload is an object instance containing the resource values. |
| New Value | Yes | — | The new value included in the payload to update the object instance or resource. |

Write Attributes

"Write attributes" operation is used to change (write) attributes of a resource or an object instance. "Write attributes" operation has the following parameters.

TABLE 13

| Parameter | Required | Default Value | Notes |
|---|---|---|---|
| Object ID | Yes | — | Indicates the object. |
| Object Instance ID | Yes | — | Indicates the object instance to write attributes. |
| Resource ID | No | — | Indicates the resource to write attributes. |
| Minimum Period | No | 1 | When present, the minimum period indicates the minimum time in seconds the client should wait from the time when sending the last notification to the time when sending a new notification. In the absence of this parameter, the minimum period is defined by the default minimum period set in the LWM2M server object instance related to that server. |
| Maximum Period | No | — | When present, the maximum period indicated the maximum time in seconds the client should wait from the time when sending the last notification to the time sending the next notification (regardless if the value has changed). In the absence of this parameter, the maximum period is up to the server. The maximum period must be greater than the minimum period parameter. In the absence of this parameter, the maximum period is defined by the default maximum period set in the LWM2M server object instance related to that server. |
| Greater than | No | — | When present, the client should notify its value when the value is above the number specified in parameter. |
| Less than | No | — | When present, the client should notify its value when the value is below the number specified in the parameter. |
| Step | No | — | When present, the client should notify its value when the value is changed more than the number specified in the parameter from the resource value when the client receives the observe operation.. |

The parameters "minimum period", "maximum period", "greater than", "less than" and "step" are used along with "Observe" operation. The parameters "maximum period" and/or "minimum period" are used to control how often "Notify" operation is transmitted by the M2M client for an observed object instance or resource. The parameters "greater than", "less than" and "step" need to be specified only when the resource ID is indicated. The parameters "greater than", "less than" and "step" need to be supported only when the resource type is number (e.g. integer, decimal).

Execute

"Execute" operation is used by the M2M server to initiate an operation and can be performed only for individual resources. The M2M client returns error when "Execute" operation is received for object instances or resource instances. "Execute" operation has the following parameters.

TABLE 14

| Parameter | Required | Default Value | Notes |
|---|---|---|---|
| Object ID | Yes | — | Indicates the object. |
| Object Instance ID | Yes | — | Indicates the object instance. |
| Resource ID | Yes | — | Indicates the resource to execute. |

Generate

"Generate" operation is used by the M2M server to generate an object instance in the M2M client. "Generate" operation needs to target one of an object instance or object that is not instantiated.

An object instance generated in the M2M client by the M2M server should be of an object type supported by the M2M client and the M2M server is notified of the object instance using "Register" and "Update" operations of the device registration interface.

An object that supports at most one object instance should be allocated an object instance ID of 0 when the object instance is generated. "Generate" operation has the following parameters.

TABLE 15

| Parameter | Required | Default Value | Notes |
|---|---|---|---|
| Object ID | Yes | — | Indicates the object. |
| Object Instance ID | No | — | Indicates the object instance to create. If this resource is not specified, the client assigns the ID of the object instance. |
| New Value | Yes | — | The new value included in the payload to create the object instance. |

Delete

"Delete" operation is used for the M2M server to delete an object instance in the M2M client. The object instance deleted from the M2M client by the M2M server should be an object instance that is notified to the M2M server by the M2M client using "Register" and "Update" operations of the device registration interface. "Delete" operation has the following parameters.

TABLE 16

| Parameter | Required | Default Value | Notes |
|---|---|---|---|
| Object ID | Yes | — | Indicates the object. |
| Object Instance ID | Yes | — | Indicates the object instance to delete. |

Observe

The M2M server can initiate observation request for changes in a specific resource in the M2M client, resources in an object instance or all object instances of an object. Related parameters for "Observe" operation are set by "Write Attributes" operations and the aforementioned parameters are set by "Write Attributes" operation. "Observe" operation includes the following parameters.

TABLE 17

| Parameter | Required | Default Value | Notes |
|---|---|---|---|
| Object ID | Yes | — | Indicates the object. |
| Object Instance ID | No | — | Indicates the object instance to observe. If no object instance ID is indicated, then all the object instances of objects are observed and resource ID must not be specified. |
| Resource ID | No | — | Indicates the resource to observe. If no resource ID is indicated, then the whole object instance is observed. |

Cancel Observe

"Cancel Observe" operation is transmitted from the M2M server to the M2M client to cancel observation for an object instance or a resource. "Cancel Observe" operation has the following parameters.

TABLE 18

| Parameter | Required | Default Value | Notes |
|---|---|---|---|
| Object ID | Yes | — | Indicates the object. |
| Object Instance ID | No | — | Indicates the object instance to stop observing. If no object instance ID is indicated, then object ID is indicated and resource ID must not be specified. |
| Resource ID | No | — | Indicates the resource to stop observing. If no resource ID is indicated, then the whole object instance is indicated. |

Figure 7:
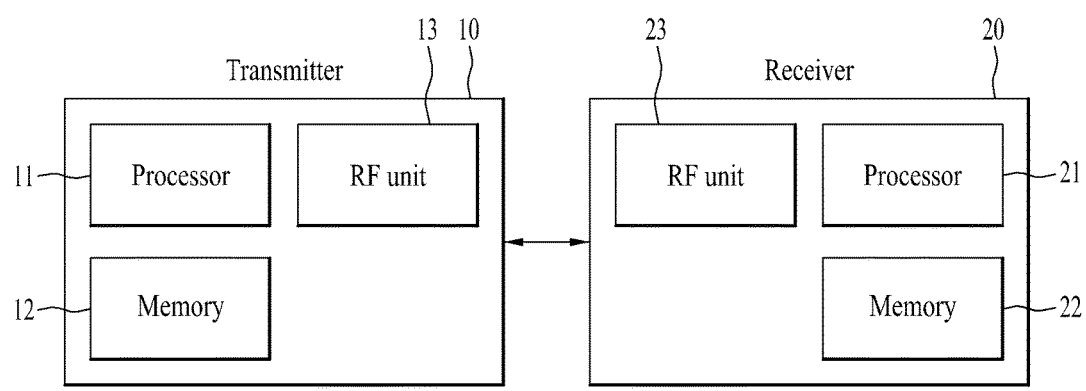
FIG. 7 is a block diagram of an apparatus for implementing embodiments of the present invention.

FIG. 7 is a block diagram of an apparatus for implementing the embodiments of the present invention. A transmitter 10 and a receiver 20 respectively include radio frequency (RF) units 13 and 23 for transmitting and receiving RF signals carrying information and/or data, signals, messages, etc., memories 12 and 22 storing information related to communication in a wireless communication system, and processors 11 and 21 which are operatively connected to the RF units 13 and 23 and the memories 12 and 22 and control the RF units 13 and 23 and the memories 12 and 22 such that the transmitter and the receiver perform at least one of the embodiments of the present invention.

The memories 12 and 22 can store programs for processing and control of the processors 11 and 21 and temporarily store input/output information. The memories 12 and 22 can function as buffers.

The processors 11 and 21 control overall operations of modules in the transmitter and the receiver. Particularly, the processors 11 and 12 can execute various control functions for implementing the present invention. The processor may be referred to as a controller, microcontroller, microprocessor, microcomputer, etc. The processors 11 and 21 may be achieved by various means, for example, hardware, firmware, software, or a combination thereof. When the present invention is implemented using hardware, ASICs (application specific integrated circuits), DSPs (digital signal processors), DSDPs (digital signal processing devices), PLDs (programmable logic devices), FPGAs (field programmable gate arrays), etc. configured to implement the present invention can be included in the processors 11 and 12. When the present invention is implemented using firmware or software, firmware or software can be configured to include a module, a procedure, a function, etc. for executing functions or operations of the present invention. The firmware or software configured to implement the present invention can be included in the processors 11 and 21 or stored in the memories 12 and 22 and executed by the processors 11 and 21.

In the embodiments of the present invention, an M2M server, an M2M client, a server or a terminal can operate as an apparatus in which the M2M server, M2M client, server or terminal is mounted or installed, that is, the transmitter 10 or the receiver 20.

The M2M server, M2M client, server or terminal as the transmitter or receiver can be configured such that the aforementioned embodiments of the present invention are independently applied or two or more thereof are simultaneously applied.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The present invention can be used for a UE, eNB, server or other apparatus of a wireless mobile communication system.

What is claimed is:

1. A method for creating, by a terminal, an access control object instance in a wireless communication system, the method comprising:
   receiving an operation for adding a first server account for a first server;
   adding the first server account of the first server such that the terminal has at least the first server account of the first server and a second sever account of a second server; and
   after the first server account is added, when one of the first server and the second server commands the terminal to create an object instance, creating an access control object instance for the object instance of which an access control owner is the one of the first server and the second server which commands the terminal to create the object instance,
   wherein the first server account is composed of a server security object instance for which bootstrap server resource is set to false and a server object instance associated therewith.

2. The method according to claim 1, wherein the first server account is added through a bootstrap interface.

3. The method according to claim 1, wherein the second server account exists in the terminal when the first server account is added, and the second server has access rights for all object instances.

4. The method according to claim 1, wherein the access control owner is able to modify the access control object instance.

5. A terminal configured to create an access control object instance in a wireless communication system, the terminal comprising:
   a transmitter and a receiver; and
   a processor that controls the transmitter and the receiver, wherein the processor:
   receives an operation for adding a first server account for a first server;
   adds the first server account of the first server such than the terminal has at least the first server account of the first server and a second sever account of a second server; and
   after the first server account is added, when one of the first server and the second server commands the terminal to create an object instance, creates an access control object instance for the object instance of which an access control owner is the one of the first server and the second server which commands the terminal to create the object instance,
   wherein the first server account is composed of a server security object instance for which bootstrap server resource is set to false and a server object instance associated therewith.

6. The terminal according to claim 5, wherein the first server account is added through a bootstrap interface.

7. The terminal according to claim 5, wherein the second server account exists in the terminal when the first server account is added, and the second server has access rights for all object instances.

8. The terminal according to claim 5, wherein the access control owner is able to modify the access control object instance.

* * * * *